(12) United States Patent  
Zhu et al.

(10) Patent No.: US 8,767,124 B2  
(45) Date of Patent: Jul. 1, 2014

(54) METHOD OF PICTURE-IN-PICTURE FOR MULTIMEDIA APPLICATIONS

(75) Inventors: Lihua Zhu, Burbank, CA (US); Jun Li, Cranbury, NJ (US); Zhenyu Wu, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/809,812

(22) PCT Filed: Jul. 11, 2011

(86) PCT No.: PCT/US2011/043494  
§ 371 (c)(1), (2), (4) Date: Jan. 11, 2013

(87) PCT Pub. No.: WO2012/009245  
PCT Pub. Date: Jan. 19, 2012

(65) Prior Publication Data  
US 2013/0113996 A1    May 9, 2013

Related U.S. Application Data

(60) Provisional application No. 61/363,699, filed on Jul. 13, 2010, provisional application No. 61/363,697, filed on Jul. 13, 2010.

(51) Int. Cl.  
*H04N 7/00* (2011.01)  
*H04N 5/45* (2011.01)  
*H04N 21/8543* (2011.01)  
*H04N 21/431* (2011.01)  
*H04N 21/2365* (2011.01)

(52) U.S. Cl.  
CPC ............. *H04N 5/45* (2013.01); *H04N 21/8543* (2013.01); *H04N 21/4316* (2013.01); *H04N 21/2365* (2013.01)

USPC ..................... 348/565; 348/473; 348/474

(58) Field of Classification Search  
USPC .......... 345/565, 473, 474, 467, 564, 566–568  
See application file for complete search history.

(56) References Cited

U.S. PATENT DOCUMENTS 6,741,617 B2 * 5/2004 Rosengren et al. ........... 370/536  
2007/0039032 A1   2/2007 Goldey et al.

FOREIGN PATENT DOCUMENTS

EP    1 008 933 A2    6/2000  
EP    1 487 212 A1    12/2004  
(Continued)

OTHER PUBLICATIONS

International Standard, "Information technology—Generic coding of moving pictures and associated audio information: Systems", ISO/IEC 13818-1, Third Edition, Oct. 15, 2007, 36 pgs.

(Continued)

*Primary Examiner* — Michael Lee  
(74) *Attorney, Agent, or Firm* — Robert D. Shedd; Jeffrey M. Navon

(57) ABSTRACT

A method and a device for preparing a media stream containing more than one component stream for picture-in-picture applications are described along with the corresponding method and device for rendering the media stream in a picture-in-picture mode. The invention allows for live and dynamic picture-in-picture rendering of the component streams contained in the media stream. Extensions to the media formats that shall support various multimedia applications, such as the MPEG-2 Transport Stream and ISO media format, are proposed to enable such a dynamic picture-in-picture functionality.

19 Claims, 3 Drawing Sheets

(56) References Cited

FOREIGN PATENT DOCUMENTS

| EP | 2 144 248 A2 | 1/2010 |
| WO | 2007/013769 A1 | 2/2007 |
| WO | 2009/095080 A1 | 8/2009 |
| WO | 2009/126686 A1 | 10/2009 |

OTHER PUBLICATIONS

International Standard, "Information technology—Coding of audio-visual objects—, Part 12:ISO base media file format", ISO/IEC 14496-12, Third Edition, Oct. 15, 2008, 7 pgs.

* cited by examiner

METHOD OF PICTURE-IN-PICTURE FOR MULTIMEDIA APPLICATIONS

CROSS-REFERENCE TO RELATED APPLICATIONS

This application claims the benefit, under 35 U.S.C. §365 of International Application PCT/US2011/043494, filed Jul. 11, 2011, which was published in accordance with PCT Article 21(2) on Jan. 19, 2012 in English and which claims the benefit of U.S. provisional patent application No. 61/363, 699, filed Jul. 13, 2010 and U.S. provisional patent application No. 61/363,697, filed Jul. 13, 2010.

TECHNICAL FIELD

The present invention relates generally to picture-in-picture for multimedia applications such as transmission and rendering. More specifically, the invention relates to support of picture-in-picture functionality and improvement of the flexibility of picture-in-picture for multimedia applications.

BACKGROUND OF THE INVENTION

Picture-in-picture (PIP) allows viewers to view multiple separate video sources simultaneously. For example, some Blu-ray Disc titles include a picture-in-picture track that allows the viewer to see the director's comment on a film they are watching. Traditionally, such as in Blu-ray Disc applications, the picture-in-picture is implemented by generating a hard coded PIP video, i.e. by replacing the regions in the background video with a foreground video. The hard coded PIP video is compressed and transmitted to the receiver. As a result, viewers are not able to dynamically adjust the PIP, such as to enable/disable the PIP feature (unless a copy of the background video is sent separately), to change the position of the foreground video, etc. Another traditional PIP application is to overlay two independent video streams at the player side, where video transport cannot provide any correlation information of the PIP video streams.

With the development of interactive media technology, multiple video components can be correlated and form a set of media, i.e. PIP media. The rendering of the PIP media can be dynamic, which means the position, scaling and alpha blending of the foreground videos can vary during playback, determined by either content creation or user interactions. In the previous example wherein a foreground video shows a director commenting on the background video, dynamic PIP enables the effect that the director points to different positions of the background video by e.g. moving the foreground video.

One deficiency of the current media file formats, such as MPEG2 transport stream and ISO media file format, is that they cannot live or dynamically update the information of position, layer and scaling for the PIP stream in the system layer (i.e. the transport layer). Without the dynamic position and scaling information, it is not possible to reliably fit or overlay a video source on a display region that does not share the same resolution. One possibility is to retrieve the information from the video decoder. Depending on the codec and the output of a particular encoder, such information may not exist or may not be reliable. It may also be difficult for a system to extract this information from the codec as well. A system-level approach is a better approach to offering a consistent experience regardless of the underlying video codec used.

The present invention provides solutions to support picture-in-picture functionality and improve the flexibility of picture-in-picture for multimedia applications such as transmission and rendering.

SUMMARY OF THE INVENTION

This invention directs to methods and apparatuses for preparing a media stream containing a plurality of component streams for picture-in-picture application and for rendering such a media stream in a picture-in-picture mode.

According to an aspect of the present invention, there is provided a method for preparing a media stream containing a plurality of component streams for picture-in-picture applications. Picture-in-picture information is generated based on the plurality of component streams contained in the media stream. Such picture-in-picture information is embedded into the media stream before sending to the receiver. An apparatus for performing such a method is also provided. The apparatus comprises a correlator, which generates picture-in-picture information from the plurality of component streams contained in the media stream, and an embedder for inserting the picture-in-picture information into the media stream.

According to another aspect of the present invention, there is provided a method for rendering a media stream containing a plurality of component streams in a picture-in-picture mode. The picture-in-picture information related to the media stream is obtained. According to such picture-in-picture information, a plurality of component streams is extracted from the media stream and is rendered in a picture-in-picture mode. An apparatus for implementing the method is also provided. Such an apparatus comprises an extractor and a processor. The extractor extracts, from the media stream, picture-in-picture information, and a plurality of component streams according to the picture-in-picture information. The extracted component streams are processed in the processor for rendering in a picture-in-picture mode.

BRIEF DESCRIPTION OF THE DRAWINGS

The above features of the present invention will become more apparent by describing in detail exemplary embodiments thereof with reference to the attached drawings in which.

DETAILED DESCRIPTION

In the present invention, a system level PIP solution is proposed by inserting the PIP information, such as the resolution/size, the location and the aspect ratio of each component stream in a PIP mode, to the bit stream at system level, so that the receiver can dynamically operate the PIP without accessing the information from the decoder.

Figure 1:
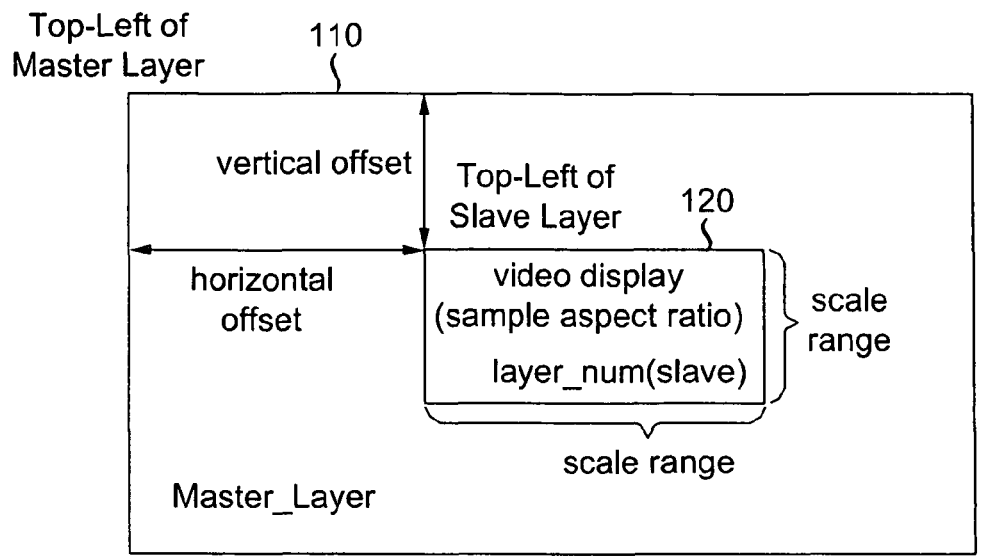
FIG. 1 illustrates a picture-in-picture display mode with one slave layer picture overlaying on a master layer picture.

FIG. 1 illustrates the picture-in-picture display mode with two picture sources. The background picture is labeled as a master layer 110 and the foreground picture is labeled as a slave layer 120. In one embodiment, the location of the slave layer 120 is defined with respect to the master layer 110 as a pair of offsets (a horizontal offset and a vertical offset). The aspect ratio and the resolution of the slave layer 120 are also determined according to the desired display region in the master layer 110. Other parameters, such as alpha blending of the master and slave layer pictures, can also be defined according to the application. The present invention can support multiple slave layers. Each layer can be defined in a similar way. In a different embodiment, the master layer and slave layers can be defined with respect to a fixed picture/video called anchor picture/video so that the location, scaling and other PIP information are aligned for all layers. In the present invention, we refer to the content stream that consists of a master layer or a slave layer as a component stream. Note that a component stream can be a video, an image, subtitles, or a base layer video, an enhancement layer video in SVC or one view of the video in MVC. In the following, video component streams are used to describe the invention. The same principles apply to other component types.

Figure 2:
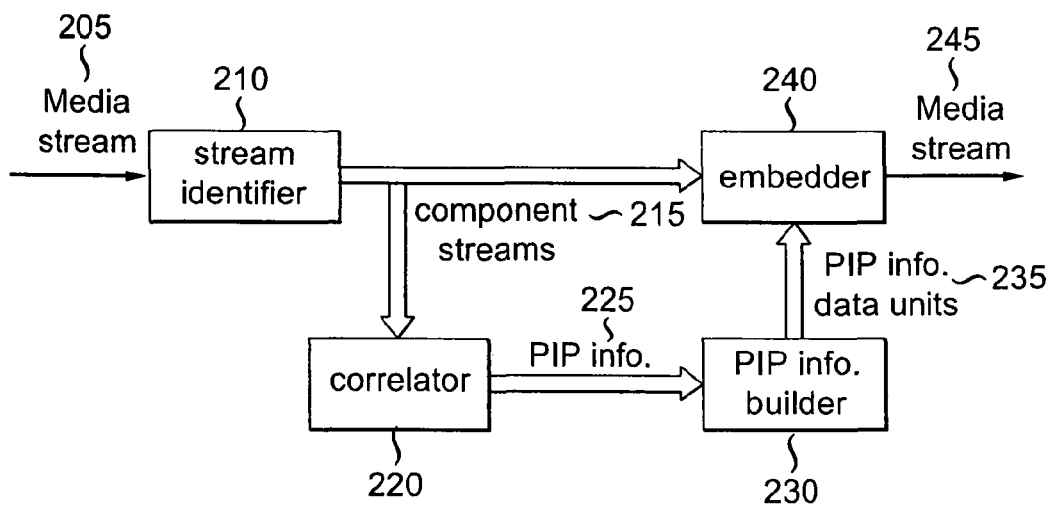
FIG. 2 shows the structure of an apparatus used to prepare, according to the present invention, a media stream which contains multiple component streams for picture-in-picture purpose.

FIG. 2 shows an apparatus for preparing a media stream which contains multiple component streams for picture-in-picture purposes. The media stream can be, for example, a program stream or a transport stream. A stream identifier 210 identifies the component streams 215 contained in the media stream 205. A correlator 220 correlates those identified component streams according to picture-in-picture relationships. Such PIP relationships are determined by the application. In one application, a video of satellite images as a slave video may be, for example, associated/correlated with a video of a meteorologist commenting on the weather forecast as a master video. In a different application, the video of satellite images as a master video is associated with a video recording a local town hit by a tornado as a slave video for education purposes. The correlator 220 also generates the PIP information 225 based on the information of the master and slave component videos. The PIP information 225 includes, but is not limited to, Layer information that indicates the overlapping relationship among different layers, such as which component video is the master layer video, and which component video is the slave layer video. For applications that support multiple slave layers, the layer information also includes the overlapping relationship among the slave layers.

Position information that indicates the position of each layer when displayed in a picture-in-picture mode. In one embodiment, the position information can be calculated with respect to the master layer component video. In a different embodiment, the position information is with respect to an anchor component video.

Size information that indicates the size or resolution of each layer when displayed a picture-in-picture mode. In one instance, the size or resolution of a slave layer video is determined by the size of the region in the master layer video that is intended for displaying the slave layer video.

Aspect ratio information that indicates the aspect ratio of each layer when displayed in a picture-in-picture mode. Similarly, in one instance, the aspect ratio of a slave layer video is determined by the aspect ratio of the region in the master layer video that is intended for displaying the slave layer video.

Other information, such as alpha blending of the layers, can also be included.

The identified PIP information 225 may be inserted into the media stream by an embedder 240. In one embodiment, such embedding is realized by feeding the PIP information 225 into a PIP information builder 230 to generate PIP information data units 235. The information data units 235 carry the same information as the PIP information 225, but conform to the format of the component streams 215. The embedder 240 inserts the format compliant PIP information data units 235 into the media stream along with the component stream 215 so that the PIP information can be associated with component streams to enable PIP at the receiver side. The output media stream 245 is different from the input media stream 205 in that the output media stream 245 contains the PIP information inserted by the embedder 240.

Figure 3:
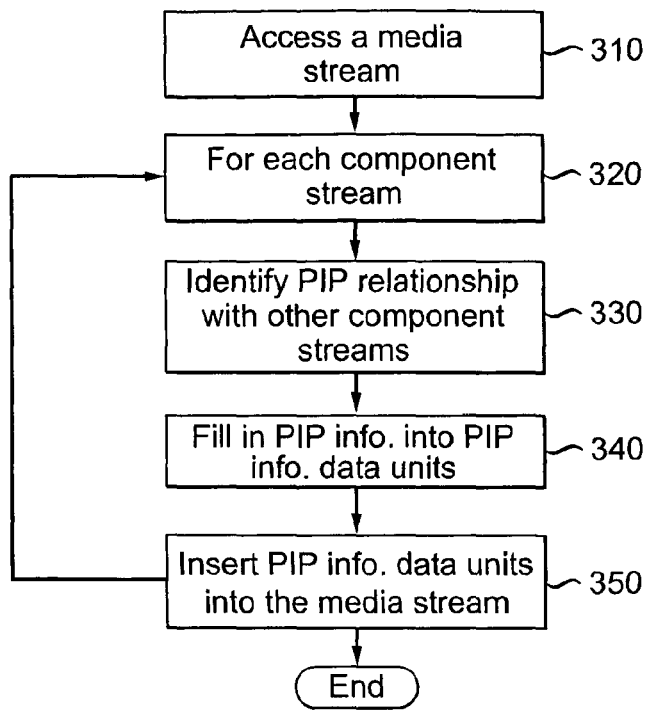
FIG. 3 shows one embodiment of the current invention to prepare a media stream for use in a picture-in-picture application.

FIG. 3 shows the process of preparing a media stream which contains multiple component streams for picture-in-picture applications. At step 320, each component stream contained in the media stream retrieved at step 310 is examined. First, the PIP relationship of the current component stream with other component streams is identified in step 330. Meanwhile, the PIP information as mentioned above is generated. Such PIP information is encapsulated into PIP information data units at step 340 which are compliant with the format of the media stream. The PIP information data units are inserted into the media stream at step 350 to be sent to the receiver.

In general, the PIP information for the component streams is stable for a certain period of time, such as within one scene of the video. That is, the value of position, size and other PIP information remain the same for all the frames within that scene. However, as the content of the component stream for either the master layer or the slave layer changes, the PIP information may need to be updated. One example of such a change is that the topic of the director's commenting changes which requires moving the video of the director to a different position and with a different size and aspect ratio. Another example could be that the source of the slave layer video switches to a different component stream. Such changes of PIP information need to be updated and inserted into the media stream. If PIP information data units are used for carrying the PIP information, the PIP information data units should also be rebuilt based on the updated PIP information in compliant with the format of the media stream and embedded into the media stream.

The present invention targets on supporting the multiple component relationship. It can be used in many multimedia applications such as the HTTP streaming and enriching the functionalities of HTML5. In the following, two embodiments of PIP information data unit design are disclosed for two streaming standards that shall support HTTP streaming: MPEG 2 Transport stream and ISO media format streaming. Since the current versions of both standards do not support system level PIP implementation, the proposed embodiments would be extensions to the current standards. It would be appreciated that those skilled in the art will be able to devise various versions of the PIP information data units that, although not explicitly described or shown herein, embody the present principles and are included within its spirit and scope.

Listed in Table 1 is the proposed PIP information data unit for the MPEG-2 TS specification, referred to as a pip_descriptor. The descriptor contains details of a video source's position, scaling and aspect ratio information. The syntax of the pip_descritor is explained as follows:

TABLE 1

PiP descriptor

| Syntax | No. of bits | Mnemonic |
|---|---|---|
| pip_descriptor( ) { | | |
|   descriptor_tag | 8 | Uimsbf |
|   descriptor_length | 8 | Uimsbf |
|     master_layer | 8 | Uimsbf |
|       layer_num | 8 | Uimsbf |
|     horizontal_offset | 16 | uimsbf |
|       vertical_offset | 16 | uimsbf |
|     scale_info_present_flag | 1 | Uimsbf |
|     if(scale_info_present_flag){ | | |
|         width | 16 | Uimsbf |
|         height | 16 | Uimsbf |
|     } | | |
|   aspect_ratio_info_present_flag | 1 | uimsbf |
|   if( aspect_ratio_info_present_flag ) { | | |
|     aspect_ratio_idc | 4 | uimsbf |
|     if( aspect_ratio_idc = = Extended_SAR ) { | | |
|     sar_width | 8 | uimsbf |
|     sar_height | 8 | uimsbf |
|     } | | |
|     flexibility | 2 | bslbf |
|     reserved | 2 | bslbf |
|   } | | |
| } | | | descriptor_tag—The descriptor_tag is an 8 bit field which identifies each descriptor in MPEG-2 standard. For more details about descriptors in MPEG-2, see Section 2.6 of *Information technology—Generic coding of moving pictures and associated audio information: systems*, ISO/IEC 13818-1:2007.

descriptor_length—The descriptor_length is an 8 bit field specifying the number of bytes of the descriptor immediately following the descriptor_length field.

layer_num—This field indicates how a master layer component video and slave layer component videos overlap. A value of 0 is the lowest layer during overlay. In general, for one display, if there is any overlap between layer i content with layer j content and i<j, layer j content will be rendered for the overlapped region. Using the parameter of layer_num, the support for multiple-display devices can be easily implemented. In a system with multiple displays/screens, such as using a TV as a major display screen and an iPad as a secondary display screen, the application can assign a higher probability for the content in the component stream with higher layer_num value to be rendered on a secondary display screen.

master_layer—This field indicates which component video is the master layer of current component video layer. If the value of master layer is same as the value of layer number, it means the current component video is a master layer.

horizontal_offset—This field indicates the horizontal position of the top left pixel of a current component video display region with respect to the top left pixel of the master layer component video or display region as shown in FIG. 1. This value can also be measured with respect to an anchor component video.

vertical_offset—This field indicates the vertical position of the top left pixel of a current component video display region with respect to the top left pixel of the master layer component video display region as shown in FIG. 1. This value can also be measured with respect to an anchor component video.

width—This field is the horizontal size of a display region for a current component video. Video frames of the current component video are scaled to this size.

height—This field is the horizontal size of a display region for a current component video. Video frames of the current component video are scaled to this size.

aspect_ratio_info_present_flag—If the value of this field equals to 1, it means that aspect_ratio_idc is present. If aspect_ratio_info_present_flag equals to 0, then aspect_ratio_idc is not present.

aspect_ratio_idc—This field specifies the value of the sample aspect ratio of the luma samples in the component video. Table-2 shows the meaning of the code.

When aspect_ratio_idc indicates Extended_SAR, the sample aspect ratio is represented by sar_width and sar_height. When the aspect_ratio_idc syntax element is not present, aspect_ratio_idc value shall be inferred to be equal to 0.

TABLE 2

Meaning of sample aspect ratio indicator

| aspect_ratio_idc | Sample aspect ratio | Decimal form |
|---|---|---|
| 0 | Unspecified | |
| 1 | 1:1("square") | 1:1 |
| 2 | 10:11 | 0.9:1 |
| 3 | 32:30 | 1.066:1 |
| 4 | 59:54 | 1.09:1 |
| 5 | 4:3 | 1.33:1 |
| 6 | 3:2 | 1.5:1 |
| 7 | Extended_SAR | | sar_width indicates the horizontal size of the sample aspect ratio (in arbitrary units).

sar_height indicates the vertical size of the sample aspect ratio (in the same arbitrary units as sar_width).

sar_width and sar_height shall be relatively prime or equal to 0. When aspect_ratio_idc is equal to 0 or sar_width is equal to 0 or sar_height is equal to 0, the sample aspect ratio shall be considered unspecified.

flexibility indicates the PIP behavior for a player. When it is set to 0, it is a type of hard coded PIP and means player cannot alternated it or remove it which can be used in applications such as none removable Ads. When the flexibility field is set to 1, player can alternate the PIP according to an algorithm such as screen size and point-of-interest mask layer etc. When the flexibility field is set to 2, player allows user to change the PIP and even turn off PIP, which can enhance the interactivity experience and also reduce the control overhead.

In a picture-in-picture mode, the target_background_descriptor and pip_descriptors are used to place the video at a specific location in the display as shown in FIG. 1. The target_background_descriptor is explained in more detail in section 2.6.12 of *Information technology—Generic coding of moving pictures and associated audio information: systems*, ISO/IEC 13818-1:2007. The pip_descriptor shall be included in the descriptor loop of the program map table/section (PMT) defined in Section 2.4.4.8 of *Information technology—Generic coding of moving pictures and associated audio information: systems*, ISO/IEC 13818-1:2007. When the updating of PIP information is necessary, the pip_descriptor can be dynamically updated along with the PMT information.

For ISO media file format, two PIP information boxes are proposed, one for live updating and one for offline updating.

The live updating PIP information box is used during live streaming, wherein the PIP information box is included in the metadata portion of the component stream and can be updated constantly. The offline updating PIP information box is used with offline applications such as DVD, whereby the PIP information is only sent once in the box and the information is inserted in the data sample portion of the stream. When the PIP information changes, the PIP information box is updated and inserted into the current data sample portion of the stream.

1. PIP information box for the live updating
   Definition:
   Box Type: 'pipl'
   Container: Track Fragment Box ('traf') or Track Box ('trak')
   Mandatory: No
   Quantity: Zero or one
   Syntax:

```
aligned(8) class PiPInfoBox extends    Box ('pipl') {
   template int(16) layer_num = 0;
   template int(16) master_layer = 0;
   unsigned int(32) horizontal_offset;
   unsigned int(32) vertical_offset;
   unsigned int(32) width;
   unsigned int(32) height;
}
```

Semantics
Each entry is the same as explained before.

2. PIP information box for the offline updating
   Definition:
   Box Type: 'pips'
   Container: Sample Table Box ('stbl')
   Mandatory: No
   Quantity: Zero or one
   Syntax:

```
aligned(8) class PiPInfoBox extends    Box ('pips') {
   unsigned int(32) entry_count;
   int i;
   for (i=0; i < entry_count; i++) {
      unsigned int(32) pip_sample_number;
      template int(16) layer_num = 0;
      template int(16) master_layer = 0;
      unsigned int(32) horizontal_offset;
      unsigned int(32) vertical_offset;
      unsigned int(32) width;
      unsigned int(32) height;
   }
}
```

Semantics
entry_count—is an integer that gives the number of entries in the following table. Each entry corresponds to a component stream in the media stream. pip_sample_number—gives the number of the samples for which that are PIP points in the stream. The details about the definition of a sample can be found at Section 3.1.10 of *Information Technology—Coding of Audio-Visual Objects—Part* 12: ISO base media file format.

At the receiver side, in order to render the picture-in-picture for a media stream that contains multiple component streams, PIP information is extracted from the media stream. According to the PIP information, a plurality of component streams, including a master layer component stream and one or more slave layer component streams, are determined and extracted from the media stream. The component streams, including the master layer and slave layer component streams, are rendered according to the PIP information. In some cases, for example when the video content in the component stream has different size/resolution and aspect ratio from the required size and aspect ratio for PIP, the component stream needs to be pre-processed before rendering. Such a pre-processing relates to a scaling operation of the component streams. Other pre-processing would be necessary depending on the component streams and the PIP information. The rendering process will constantly monitor the PIP information, and make changes whenever PIP information has updates.

Figure 4:
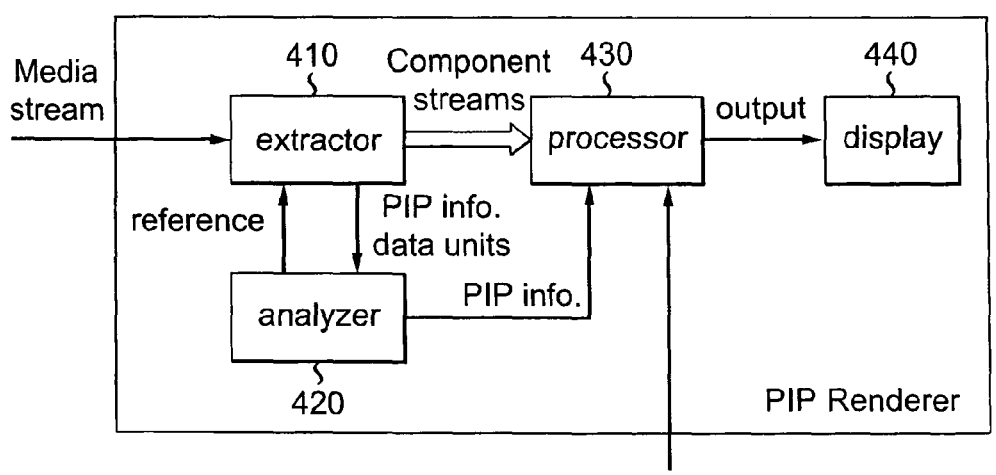
FIG. 4 shows the structure of a picture-in-picture rendering device used to read a media stream containing picture-in-picture information and render the stream in a picture-in-picture mode.

FIG. 4 shows the structure of a PIP rendering device used to read a media stream containing PIP information. Extractor 410 extracts PIP information from the input media stream, and further extracts a master component stream and all slave component streams from the media stream according to the PIP information. A processor 430 processes the extracted component streams according to the picture-in-picture information to generate output to a display 440. In one embodiment, extractor 410 extracts PIP information data units, such as pip_descriptors or PIP information boxes from the media stream and an analyzer 420 is employed to analyze the extracted PIP information data units. One output from the analyzer 420 is the references to the master and slave layer component video streams. With those references, the extractor 410 is able to extract the necessary component streams for the processor 430. Analyzer 420 further parses the PIP information data units to generate PIP information that is understandable to the processor 430. The processor 430 can also accept outside control signals, e.g. from viewers, for controlling the PIP effect, such as enabling or disabling the PIP feature. The control signal can contain the desired position or size information for the component streams. Such information overwrites the corresponding information provided in PIP information from the media stream. The processor 430 may comprise a video decoder which decodes the extracted master and slave component streams. The decoding of master and slave layer component streams can be performed in parallel. If the pre-processing as mentioned before is necessary for the component streams, the processor 430 further performs such pre-processing by calling its pre-processor unit before generating the PIP video for displaying at display 440. Display 440 may also include more than one display screen for multi-display applications as discussed before.

Figure 5:
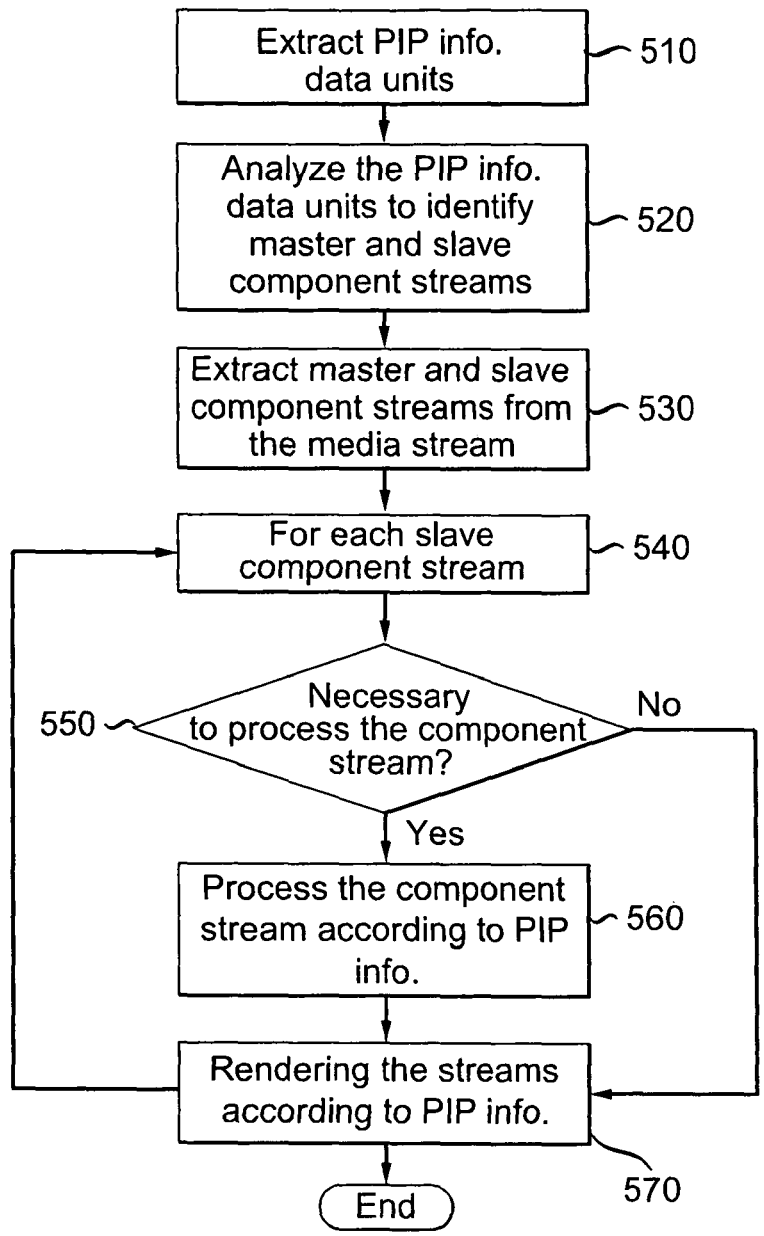
FIG. 5 shows the process of reading a media stream containing picture-in-picture information and rendering the stream in a picture-in-picture mode according to the present invention.

FIG. 5 shows a process for reading a media stream containing PIP information and rendering the stream in a PIP mode according to the present invention. PIP information data units such as pip_descriptors or PIP information boxes are extracted in step 510. PIP information is further identified in step 520 by analyzing the extracted PIP information data units, such as which streams are the master and slave layer component streams. With the PIP information, the process is able to extract the required component streams from the media stream in step 530. For each of the component streams, a decision step 550 determines whether the component stream requires pre-processing. If pre-processing is needed, the component stream content is processed according to the PIP information in step 560, such as resizing the content to a desired size and an aspect ratio. If pre-processing is determined to be unnecessary, the process moves directly to step 570 for rending. The loop for each of the component streams may be realized in parallel using multi-core processors or through multi-thread implementations.

Although preferred embodiments of the present invention have been described in detail herein, it is to be understood that this invention is not limited to these embodiments, and that other modifications and variations may be effected by one skilled in the art without departing from the scope of the invention as defined by the appended claims.

The invention claimed is:

1. A method for preparing a media stream for picture-in-picture applications, said media stream containing a plurality of component streams, the method comprising:
   generating picture-in-picture information from the plurality of component streams contained in the media stream, wherein said picture-in-picture information comprises position information, said position information indicating the position of a component stream when displayed in picture-in-picture mode; and
   inserting the picture-in-picture information into the media stream.

2. The method of claim 1, further comprising
   updating the picture-in-picture information according to changes in the plurality of component streams.

3. The method of claim 2, wherein the inserting step comprises
   building picture-in-picture data units according to the generated picture-in-picture information; and
   inserting the picture-in-picture data units into the media stream.

4. An apparatus for preparing a media stream for picture-in-picture applications, said media stream containing a plurality of component streams, the apparatus comprising:
   a correlator for generating picture-in-picture information from the plurality of component streams contained in the media stream, wherein said picture-in-picture information comprises position information, said position information indicating the position of a component stream when displayed in picture-in-picture mode; and
   an embedder for inserting the picture-in-picture information into the media stream.

5. The apparatus of claim 4, wherein the media stream is one of a transport stream and a program stream.

6. The apparatus of claim 5, further comprising
   a picture-in-picture information builder for generating picture-in-picture information data units from the identified picture-in-picture information, the picture-in-picture information data units being fed into the embedder for inserting into the media stream.

7. A method for rendering a media stream in a picture-in-picture mode, said media stream containing a plurality of component streams, the method comprising:
   obtaining picture-in-picture information related to the media stream, wherein said picture-in-picture information comprises position information, said position information indicating the position of a component stream when displayed in picture-in-picture mode;
   extracting a plurality of component streams from the media stream according to the obtained picture-in-picture information; and
   rendering the plurality of component streams according to the obtained picture-in-picture information.

8. The method of claim 7, wherein the plurality of component streams comprises a master layer component stream and at least one slave layer component stream.

9. The method of claim 7, further comprising if necessary, pre-processing at least one of the extracted plurality of component streams according to the picture-in-picture information prior to rendering.

10. The method of claim 9, wherein the obtaining step comprises
    extracting picture-in-picture information data units from the media stream; and
    analyzing the picture-in-picture information data units to identify the picture-in-picture information.

11. The method of claim 7, wherein the picture-in-picture information comprises information of layer, size, aspect ratio of the component streams in the picture-in-picture mode.

12. An apparatus for rendering a media stream in a picture-in-picture mode, said media stream containing a plurality of component streams, the apparatus comprising
    an extractor for extracting, from the media stream, picture-in-picture information, and for extracting a plurality of component streams according to the picture-in-picture information, wherein said picture-in-picture information comprises position information, said position information indicating the position of a component stream when displayed in picture-in-picture mode;
    a processor for processing the extracted plurality of component streams according to the picture-in-picture information.

13. The apparatus of claim 12, wherein the extractor extracts picture-in-picture information data units from the media stream, the apparatus further comprising
    an analyzer for analyzing the picture-in-picture information data units to get picture-in-picture information, and for providing references to the plurality of component stream to the extractor.

14. The apparatus of claim 12, wherein the picture-in-picture information further comprises at least information of layer, size, and aspect ratio of the component streams in the picture-in-picture mode.

15. The apparatus of claim 12, wherein the processor comprises a pre-processing unit for scaling the at least one component stream to a size specified in the picture-in-picture information.

16. The method of claim 3, wherein the picture-in-picture data units comprise picture-in-picture descriptors, and the inserting step further comprises
    including the picture-in-picture descriptors into a program map table of the media stream.

17. The method of claim 1, wherein the picture-in-picture information further comprises information of layer, size, aspect ratio of the component streams in the picture-in-picture mode.

18. The apparatus of claim 6, wherein the picture-in-picture data units comprise picture-in-picture descriptors, and the embedder further performs steps of
    including the picture-in-picture descriptors into a program map table of the media stream.

19. The apparatus of claim 4, wherein the picture-in-picture information further comprises at least information of layer, size, and aspect ratio of the component streams in the picture-in-picture mode.

* * * * *